(12) United States Patent
Stelzer

(10) Patent No.: US 7,140,541 B2
(45) Date of Patent: Nov. 28, 2006

(54) DATA PROCESSING METHOD FOR IMAGE LIFT WET SIGNATURE CAPTURE WITHIN RETAIL TRANSACTION

(76) Inventor: Troy Stelzer, 113 Alva St., Waconia, MN (US) 55387

( * ) Notice: Subject to any disclaimer, the term of this patent is extended or adjusted under 35 U.S.C. 154(b) by 0 days.

(21) Appl. No.: 11/112,526

(22) Filed: Apr. 22, 2005

(65) Prior Publication Data

US 2006/0237533 A1   Oct. 26, 2006

(51) Int. Cl.
G06K 15/00 (2006.01)
G06F 17/00 (2006.01)
G07G 5/00 (2006.01)

(52) U.S. Cl. ................ 235/383; 235/375; 705/24

(58) Field of Classification Search ............ 235/375, 235/379, 381, 383; 705/16–25, 39, 35
See application file for complete search history.

(56) References Cited

U.S. PATENT DOCUMENTS 5,138,140 A    8/1992  Siemiatkowski et al.
5,448,044 A    9/1995  Price et al.
5,892,824 A *  4/1999  Beatson et al. ............ 713/186
5,910,988 A *  6/1999  Ballard ........................ 705/75
6,726,094 B1 * 4/2004  Rantze et al. ............. 235/379
2002/0091537 A1 * 7/2002 Algazi ......................... 705/1
2004/0193538 A1 * 9/2004 Raines ....................... 705/39

FOREIGN PATENT DOCUMENTS

EP    517405 A2 * 12/1992

* cited by examiner

Primary Examiner—Daniel Stcyr
Assistant Examiner—April Taylor
(74) Attorney, Agent, or Firm—Briggs and Morgan, P.A.

(57) ABSTRACT

A data processing method for the capture of customers' wet signatures in retail store transactions, using a point of sale terminal interfaced with a printer and a 2D imager-based device used to capture signatures, the terminal and the 2D signature capture device communicating with a central computer. The data processing method employs a printed sales receipt with a barcode containing indicia that guide the 2D signature capture device to the area on the printed sales receipt containing the customer's wet signature.

13 Claims, 4 Drawing Sheets

11/24/2004 6:32:37PM

Gopher State Pet Store
CREDIT CARD SALE

GSP Store #101
1739 Arbor Lane Minneapolis, MN
Terminal#: 002
VC:   xxxxxxxxxxxx4733

| 2 | PARAKEET FOOD | 6.19 |
|---|---|---|
| 1 | RAWHIDE CHEW | 2.99 |
|   | Sub. Total: | 9.18 |
|   | Tax: | .55 |
|   | Total: | 9.73 |
|   | Visa: | 9.73 |
|   | Change: | 0.00 |

I AGREE TO PAY THE ABOVE TOTAL AMOUN
ACCORDING TO THE CARDHOLDER
AGREEMENT

X _John Doe_____
SIGNATURE
TRANS#: 18352          APPROVAL: 6709

Thank You For Shopping at Your Local
Gopher State Pet Store

Gopher State Pet Store
        CREDIT CARD SALE

GSP Store #101
  1739 Arbor Lane Minneapolis, MN
  Terminal#: 002
  VC:            xxxxxxxxxxxx4733

2   PARAKEET FOOD       6.19
  1   RAWHIDE CHEW        2.99
      Sub. Total:         9.18
      Tax:                 .55
      Total:              9.73

Visa:               9.73
      Change:             0.00

I AGREE TO PAY THE ABOVE TOTAL
   AMOUNT ACCORDING TO THE CARDHOLDER
                AGREEMENT

[signature: John Doe]
   X_____
                 SIGNATURE
  TRANS#: 18352         APPROVAL: 6709

[barcode]

Thank You For Shopping at
            Gopher State Pet Store
```

Fig. 2

DATA PROCESSING METHOD FOR IMAGE LIFT WET SIGNATURE CAPTURE WITHIN RETAIL TRANSACTION

BACKGROUND OF THE INVENTION

Over the last 20 years, credit cards have gained widespread acceptance as a means of paying for goods and services. In 1991, American consumers used credit cards to spend an excess of $250 billion. Worldwide, the value of credit card transactions exceeded $600 billion. The large volume of credit card transactions requires merchants to collect, transmit, and store vast amounts of transaction related data.

Debit is a distinct process and network utilized and should not be used. Passive debit is a bank card, or "check card". As used herein, the term "credit card" is intended to include credit cards, charge cards, passive debit cards, and other financial account cards. Credit cards typically include two sources of essential account information. A magnetic stripe includes the account number, expiration date, cardholder's name, and other information. Embossed characters also provide the account number, expiration date, and cardholder's name in a form that may be recognized by a merchant.

In order for a credit card transaction to be processed, a merchant must collect a variety of data associated with the transaction. This data typically includes the purchase price and date of the transaction, the account number and expiration date of the credit card, and the cardholder's name and signature. Once this data is collected, the merchant transmits the transaction data, along with its merchant identification code, to a credit card transaction processor. The credit card processor sorts the data according to the company that issued the credit card, and forwards the data to the appropriate company. At that point, the credit card issuer posts the transaction to the cardholder's account and the purchase amount is credited to the merchant.

Formerly, credit card transaction data was recorded, transferred, and stored in the form of paper receipts. Over the years, the credit card industry has developed various types of equipment that provide for the electronic acquisition, transmission, and storage of transaction data. In addition to reducing the industry's reliance on paper records, this equipment expedites the processing of credit card transactions and minimizes errors associated with the entry of transaction data. The equipment includes point-of-sale (POS) equipment used by merchants and computer systems used by credit card processors.

Most merchants employ a cash register system of some type in order to record data associated with transactions, regardless of whether payment is made with cash, check, or credit card. In addition to a cash register, merchants that accept credit cards use other POS equipment to collect data associated with the credit card. This equipment usually includes electronic terminals that read the account number and expiration date from a magnetic stripe on the credit card and transmit the transaction data to the credit card processor. Such equipment may be separate from, or integrated into, the cash register equipment.

In a typical credit card transaction, a cardholder presents a credit card to a merchant, who records transaction data using an electronic terminal. The recorded data includes the amount of the purchase, the cardholder's account number, the card's expiration date, the merchant identification number, and the date of the transaction. In most cases, the cardholder is also required to sign a copy of the receipt.

Once the terminal accumulates the transaction data, the terminal automatically dials the merchant's credit card processor or other authorization source and initiates an authorization request. When the transaction is authorized, the terminal displays and/or stores the approval code or authorization indicia received from the credit card processor. The approval code is recorded along with the other transaction data. The POS equipment typically includes a printer that is capable of printing a sales receipt. The sales receipt includes the transaction data and approval code, and provides a space for the cardholder's signature.

These earlier devices allow numeric data, such as purchase price, date, account number, and merchant identification number to be easily accumulated, stored, and transmitted between the merchant and credit card processor. Consequently, numeric transaction data may be transferred and stored without the use of paper receipts. Although this numeric data is sufficient to process the transaction, it may be insufficient to validate or authenticate a transaction that is disputed by the cardholder. In the event a cardholder questions or denies the legitimacy of a transaction that appears on his or her credit card statement, it may be necessary for the merchant to produce a copy of the signed receipt as evidence that the cardholder was a party to the transaction. Therefore, it is necessary that a copy of each signed receipt be retained by the merchant for some period of time.

This process of retaining and retrieving signed receipts is simplified if the merchant employs POS equipment that allows the cardholder's signature to be digitized, transmitted, and stored along with the numeric data associated with the transaction. In such cases, the signature is digitized as the cardholder signs the credit card receipt. The digitized signature data and numeric transaction data are combined and transmitted to the credit card processor, where the data is stored for a predetermined period of time. If a cardholder disputes the validity of a transaction, the entirety of the transaction data, including a facsimile of the signature, may be provided by the credit card processor, and may serve as evidence of the legitimacy of the transaction.

Many merchants have invested significant amounts of money in POS equipment, such as sophisticated electronic cash registers, that allows the merchant to collect all of the numeric data associated with credit card transactions. In the case of larger merchants, the POS equipment may be connected to a merchant's accounting computer system or "in-store processor" via a data communications network in order to facilitate the merchant's business operations. Although it may be advantageous to capture signatures in such cases, it is not cost effective or convenient to do so if it is necessary to add additional printers or terminals that duplicate the merchant's existing capabilities. Furthermore, a merchant's existing POS equipment may be connected to peripheral devices, such as check readers for automatically reading checking account data and PIN pads, which are used to input a debit card user's personal identification number (PIN). The existing POS equipment may not provide sufficient communications ports to allow the merchant to connect additional peripheral devices.

A number of different technologies have been used to capture a signature electronically.

The very first electronic signature capture terminals consisted of an intelligent pen and a data collection pad. The store associate would slide the printed receipt into a frame within the collection pad, and the customer would use the intelligent ink pen to sign within an opening in the frame onto the actual receipt paper. A "wet signature" as defined herein is a non-electronic signature, produced on paper or other suitable media, using ink or other suitable writing substance. The ballpoint pen would both write out the customer's "wet" signature and simultaneously record the strokes of the pen as binary data within the collection pad's frame of reference. This data would then be stored in a database for later reference. However, this technology had a number of drawbacks. First, the technology was prone to failure and required frequent replacement of a very expensive "intelligent pen" (early in the product life the cost was nearly $100). Second, a lack of manufacture competition kept hardware acquisition costs very high for retailers.

The next generation of electronic signature capture terminals was fundamentally split in two by the manufacturers' utilization of display technology.

In the first display technology (passive touch panel display technology), a passive display refers to a multi-layered resistive touch panel display. This technology features a touch panel grid sandwiched between a glass panel and a protective sheet of Mylar. The terminal captures data points (binary x, y data) when the customer presses the plastic stylus against the Mylar layer, which contacts the touch panel's grid and closes the circuit. The signature capture terminal is then able to record those data points and redraw that "point data" on the display, as a signature, a split second after capture. As the stylus appears to populate pixels during the strokes of the signature on the display, the "redraw" simulates a wet signature.

Although this technology overcame some of the earlier problems, it still had problems of its own. Early versions of this technology utilized a fixed Mylar overlay, which clouded after extensive use, and significantly obscured the display, making it difficult for the customer to see and identify his or her signature. Subsequent releases of this technology utilized a replaceable, peel-off Mylar screen protector. However, replacement of these screen protectors required store personnel to take an active role in the upkeep of these devices. This active refresh of the display's screen protector seldom occurred in the past and highlights a fundamental flaw in sign-on-glass technology. In addition, early versions of this technology suffered from what became known as "spiking," which occurs when two data entry points are recognized by the display. Spiking occurs when both the stylus and an unintended object, such as either a finger or palm of the user, touches the display at the same time. This causes simultaneous data entry points, which are redrawn by the terminal as a spike that begins within the customer signature and flares out drastically to the object's point of contact with the display. Subsequent versions of this technology utilized algorithms for palm rejection, which anticipate the signature pattern and ignore those data points outside of an average signature parameter. No "wet signature" was used in this technology.

The second display technology was capacitive displays. Capacitive displays require the use of an electronic "intelligent pen," or stylus, which orients the cursor on the display to track stylus movement across the display. This also simulates a "wet signature," by redrawing the signature simultaneously. However, this technology also has its drawbacks. First, the stylus is costly ($25.00 to $40.00 each), and this is a very common replacement part for POS terminals utilizing capacitive display technology. Styli were commonly broken or pulled from the terminal, which severed the connection and rendered the device useless. Second, capacitive displays have no Mylar to protect the glass layer of the display, so when debris, such as cement dust, lands on the display, the stylus travels over the display carrying the debris, which scratches the surface of the glass layer of the capacitive display. Third, early versions of this technology required static electricity to be built up in the body of the customer to power the electronic stylus during signature. Finally, microprocessors of that era had limited computing power and were easily overwhelmed by the requirements of this technology. Again, no "wet" signature was used.

U.S. Pat. No. 5,138,140, herein incorporated by reference, discloses signature capture using electro-optical scanning for acknowledging receipt of a delivery. However, this patent requires an identification structure defining a space for receiving the signature, such as preamble codes located at opposite boundaries of the space. Furthermore, there is no disclosure of using such signature capture in a retail environment.

Several firms manufacture electronic signature capture pads destined for use by American retailers. Examples include Symbol Technologies (www.symbol.com), Ingenico (www.ingenico-us.com), Hand Held Products (www.handheld.com), Verifone (www.verifone.com), and Hypercom (www.hypercom.com). Some of these devices may be employed to read a 2D image of a customer's "wet" signature. For example, the 2D imager or scanner may look at a barcode and read the thickness of the white spaces between the lines in the barcode to identify the orientation of the barcode. The imager may then use the barcode as a navigational aid and may be pre-programmed to lift the image in relation to the physical proximity to the barcode. Route delivery companies, such as Miller Brewing and Frito-Lay, have used 2D signature lift in the past for a proof of delivery. The typical solution utilizes a portable computing device, with an integrated 2D imager and preprinted invoices. The customer receives delivery of the product and signs an invoice acknowledging receipt. The delivery person scans a barcode that is printed on the invoice and captures the signature and key invoice data to prove delivery.

However, 2D signature lift has not yet been used, to the Applicant's knowledge, for wet signature capture in the retail store environment to integrate the signature image with the retail store's transaction log for the purpose of recording credit card transactions.

SUMMARY OF THE INVENTION

A data processing method for the capture of signatures in retail transactions which utilizes an area imager, or 2D imager, to lift the customer's "wet signature" from a sales receipt and save the image as an image file, which is linked to the actual transaction in the transaction log.

A principal object and advantage of the present invention is that it avoids the problems found in previous electronic signature capture devices.

Another principal object and advantage of the present invention is that it avoids the expense of purchasing expensive electronic signature capture devices for each point of sale terminal in a retail store.

Another principal object and advantage of the present invention is that it can be used to integrate sales data from a retail transaction with a 2D image of the customer's signature in a transaction log at a central computer.

Another principal object and advantage of the present invention is that it avoids the necessity of retaining an original sales receipt with the customer's wet signature, so that the original, signed receipt may be given to the customer.

BRIEF DESCRIPTION OF DRAWINGS

FIG. 1 shows a typical retail store sales receipt that may be printed on a printer attached to a point of sale (POS) terminal. The receipt contains an area D containing sales data and an area S for receiving the customer's wet signature.

FIG. 2 shows a retail store sales receipt that may be used with the present invention. In addition to the areas D and S, the sales receipt of FIG. 2 contains a 2D barcode B. This 2D barcode B not only may contain transaction data, but can also be used as a landmark to orient a 2D electronic signature capture device (to be described) to the signature area S.

DETAILED DESCRIPTION OF THE PREFERRED EMBODIMENT

Figure 3:
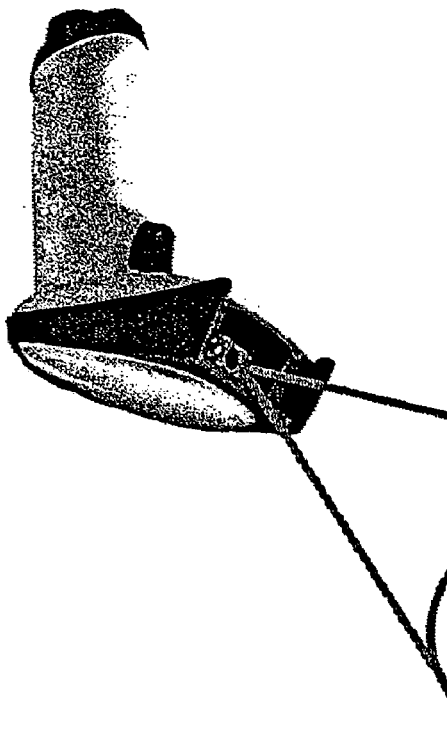
FIG. 3 is a schematic of a 2D electronic signature capture device capturing a wet signature from the sales receipt of FIG. 2.
Figure 3:
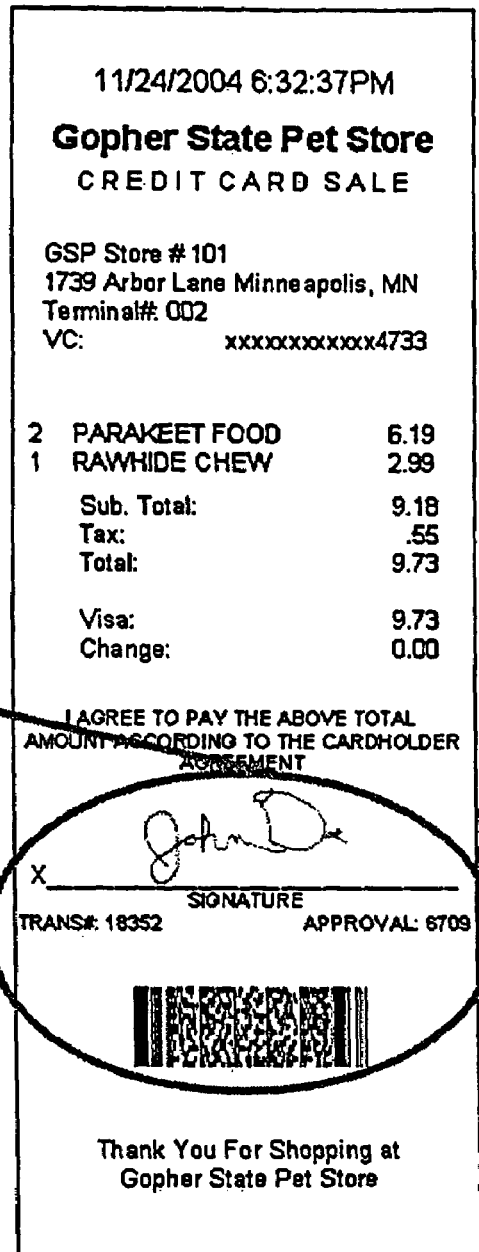
Figure 4:
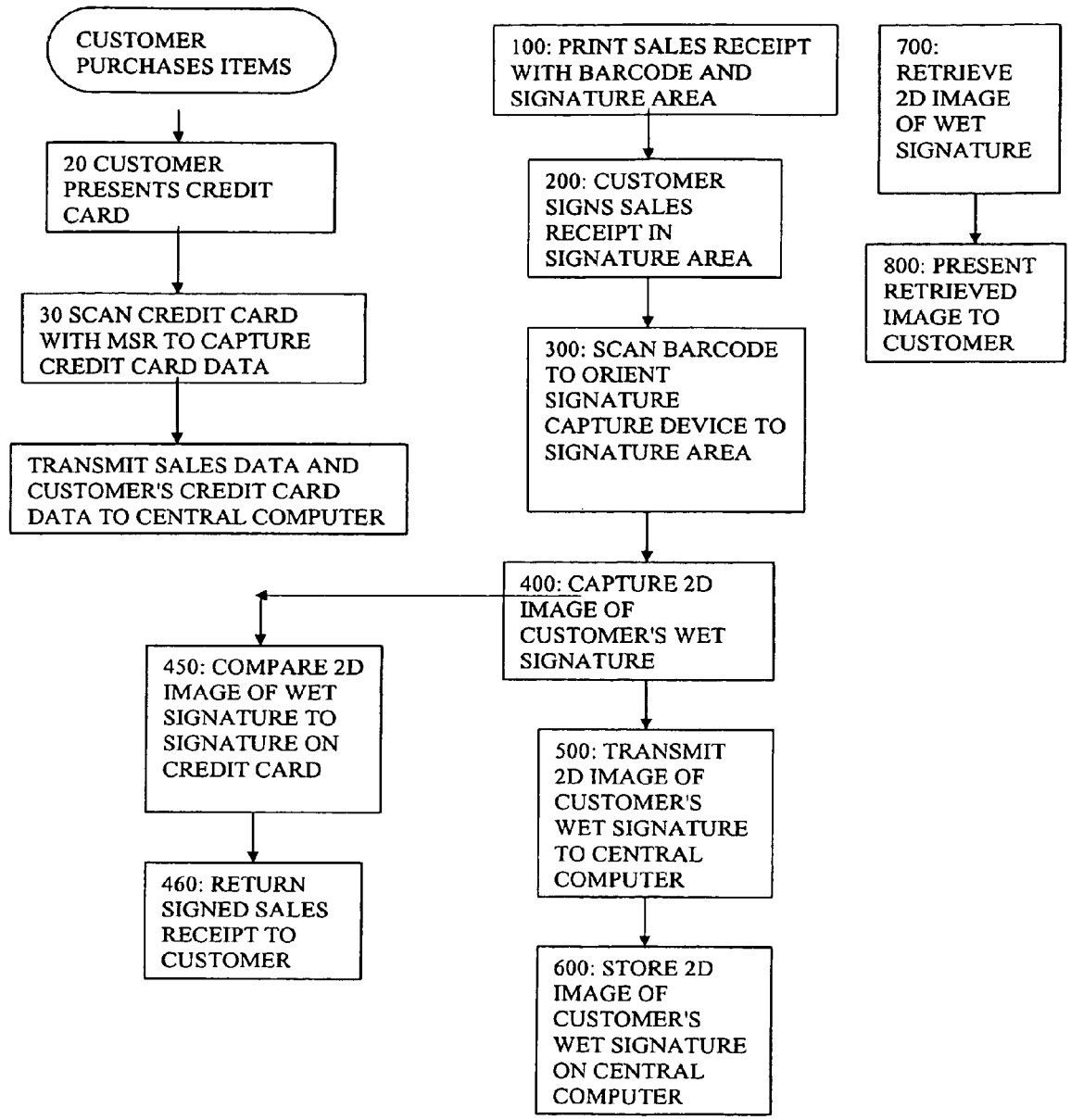
FIG. 4 is a flowchart of the present invention.

The present invention is a data processing method for the capture of customers' wet signatures in retail store transactions, using a fixed-position, or mobile point of sale terminal, or device, having an attached printer and a 2D signature capture device, the terminal and the 2D signature capture device communicating with a central computer. The data processing method comprises the steps of:

100: printing a sales receipt (as shown in FIG. 2) on a printer attached to a point of sale terminal in a retail store for a customer to sign, the printed sales receipt having a printed barcode B and a printed signature area S adjacent the printed barcode, the printed barcode B having data to orient a 2D signature capture device to the location of the printed signature area S;

200: the customer signing the sales receipt in the printed signature area A, thereby producing a wet signature;

300: scanning the barcode B on the sales receipt with the 2D signature capture device to orient the 2D signature capture device to the printed signature are S on the sales receipt.

400: capturing a 2D image of the customer's wet signature using the 2D signature capture device;

500: transmitting the 2D image of the customer's wet signature from the 2D signature capture device to a central computer; and 600: storing the 2D image of the customer's wet signature on the central computer.

In preferred embodiments, the present invention may also comprise the steps of:

10: the customer purchasing a number of items, the point of sale terminal totaling the price of the items and identifying the items purchased, thereby producing sales data;

20: the customer presenting a credit card to store personnel;

30: the store personnel scanning the credit card using a device such as a magnetic stripe reader attached to the point of sale terminal to capture the customer's credit card data; and 40: transmitting the sales data and the customer's credit card data from the point of sale terminal to the central computer.

In preferred embodiments, the present invention may also comprise the steps of:

450: the store personnel comparing the 2D image of the wet signature with the customer's signature on the credit card to verify the customer's signature; and 460: giving the signed sales receipt to the customer.

Once the 2D image of the customer's wet signature has been captured and stored in the central computer, the 2D image of the customer's wet signature may be used to prove the customer's transaction in the event that the customer challenges the transaction, by the steps of:

700: retrieving the 2D image of the customer's wet signature from the central computer; and 800: presenting the retrieved image of the customer's wet signature to the customer.

Preferably, the step 700 may be performed remotely from the central computer by data communications. Most preferably, the step 700 may be performed using a standard Web browser, such as the Internet Explorer® from Microsoft Corporation or another Web browser.

Although not specifically contemplated by the present invention, the above method could be used by a customer, as well as store administrative personnel, to retrieve a 2D image of the customer's wet signature from the central computer.

The present invention may utilize software provided by the manufacturer of the 2D scanner to orient the digital camera functionality of the scanner to the wet signature area. The imager or scanner typically sees the barcode and reads the thickness of the white space between lines in the barcode to identify the orientation of the barcode. The imager uses the barcode as a navigational aide and is pre-programmed to read or "lift" an image of the wet signature in relational to the physical proximity of the barcode. The barcode may also be encoded with transaction data which may be sent to the central computer.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A data processing method for the capture of customers' wet signatures in retail store transactions, using a point of sale terminal having an attached printer and a 2D signature capture device, the terminal and the 2D signature capture device communicating with a central computer, comprising the steps of:

(a) printing a sales receipt on a printer attached to a point of sale terminal in a retail store for a customer to sign, the printed sales receipt having a printed barcode and a printed signature area adjacent the printed barcode, the printed barcode having data to orient a 2D signature capture device to the location of the printed signature area;

(b) the customer signing the sales receipt in the printed signature area, thereby producing a wet signature;

(c) scanning the barcode on the sales receipt with the 2D signature capture device to orient the 2D signature capture device to the printed signature area on the sales receipt;

(d) capturing a 2D image of the customer's wet signature using the 2D signature capture device;

(e) transmitting the 2D image of the customer's wet signature from the 2D signature capture device to a central computer; and (f) storing the 2D image of the customer's wet signature on the central computer.

2. The data processing method of claim 1, further comprising the steps of:

(a) the customer purchasing a number of items, the point of sale terminal totaling the price of the items and identifying the items purchased, thereby producing sales data;

(b) the customer presenting a credit card;

(c) scanning the customer's credit card using a magnetic stripe reader attached to the point of sale terminal to capture the customer's credit card data; and (d) transmitting the sales data and the customer's credit card data from the point of sale terminal to the central computer.

3. The data processing method of claim 1, further comprising the steps of:

(a) retrieving the image of the customer's wet signature from the central computer; and (b) presenting the retrieved image of the customer's wet signature to the customer.

4. The data processing method of claim 3, wherein the step of retrieving the image of the customer's wet signature from the central computer is performed remotely from the central computer.

5. The data processing method of claim 4, wherein the step of retrieving the image of the customer's wet signature from the central computer is performed using a web browser.

6. A data processing method for the capture of a customer's wet signature in retail store transactions, using a point of sale terminal having an attached printer and a 2D signature capture device, the terminal and the 2D signature capture device communicating with a central computer, comprising the steps of:

(a) the customer purchasing a number of items, a point of sale terminal totaling the price of the items and identifying the items purchased, thereby producing sales data;

(b) the customer presenting a credit card;

(c) scanning the customer's credit card using a magnetic stripe reader attached to the point of sale terminal to capture the customer's credit card data;

(d) transmitting the sales data and the customer's credit card data from the point of sale terminal to the central computer;

(e) printing the sales data on a sales receipt on a printer attached to the point of sale terminal for a customer to sign, the printed sales receipt having a printed barcode and a printed signature area adjacent the printed barcode, the printed barcode having data to orient a 2D signature capture device to the location of the printed signature area;

(f) the customer signing the sales receipt in the printed signature area, thereby producing a wet signature;

(g) scanning the barcode on the sales receipt with a 2D signature capture device to orient the 2D signature capture device to the printed signature area on the sales receipt;

(h) capturing a 2D image of the customer's wet signature using the 2D signature capture device;

(i) transmitting the 2D image of the customer's wet signature from the 2D signature capture device to a central computer; and (j) storing the 2D image of the customer's wet signature on the central computer.

7. The data processing method of claim 6, further comprising the steps of:

(a) retrieving the image of the customer's wet signature from the central computer; and (b) presenting the retrieved image of the customer's wet signature to the customer.

8. The data processing method of claim 7, wherein the step of retrieving the image of the customer's wet signature from the central computer is performed remotely from the central computer.

9. The data processing method of claim 8, wherein the step of retrieving the image of the customer's wet signature from the central computer is performed using a web browser.

10. A data processing method for the capture of a customer's wet signature in retail store transactions, using a point of sale terminal having an attached printer and a 2D signature capture device, the terminal and the 2D signature capture device communicating with a central computer, comprising the steps of:

(a) the customer purchasing a number of items, a point of sale terminal totaling the price of the items and identifying the items purchased, thereby producing sales data;

(b) the customer presenting a credit card;

(c) scanning the customer's credit card using a magnetic stripe reader attached to the point of sale terminal to capture the customer's credit card data;

(d) transmitting the sales data and the customer's credit card data from the point of sale terminal to the central computer;

(e) printing the sales data on a sales receipt on a printer attached to the point of sale terminal for a customer to sign, the printed sales receipt having a printed barcode and a printed signature area adjacent the printed barcode, the printed barcode having data to orient a 2D signature capture device to the location of the printed signature area;

(f) the customer signing the sales receipt in the printed signature area, thereby producing a wet signature;

(g) scanning the barcode on the sales receipt with a 2D signature capture device to orient the 2D signature capture device to the printed signature area on the sales receipt;

(h) capturing a 2D image of the customer's wet signature using the 2D signature capture device;

(i) transmitting the 2D image of the customer's wet signature from the 2D signature capture device to a central computer;

(j) storing the 2D image of the customer's wet signature on the central computer;

(k) retrieving the image of the customer's wet signature from the central computer; and (l) presenting the retrieved image of the customer's wet signature to the customer.

11. The data processing method of claim 10, wherein the step of retrieving the image of the customer's wet signature from the central computer is performed remotely from the central computer.

12. The data processing method of claim 11, wherein the step of retrieving the image of the customer's wet signature from the central computer is performed using a web browser.

13. The data processing method of claim 10, further comprising the step of comparing the image of the customer's wet signature with the customer's signature on the credit card.

* * * * *